No. 608,291. Patented Aug. 2, 1898.
C. M. KEMP.
WATER HEATER.
(Application filed Sept. 15, 1897.)
(No Model.)
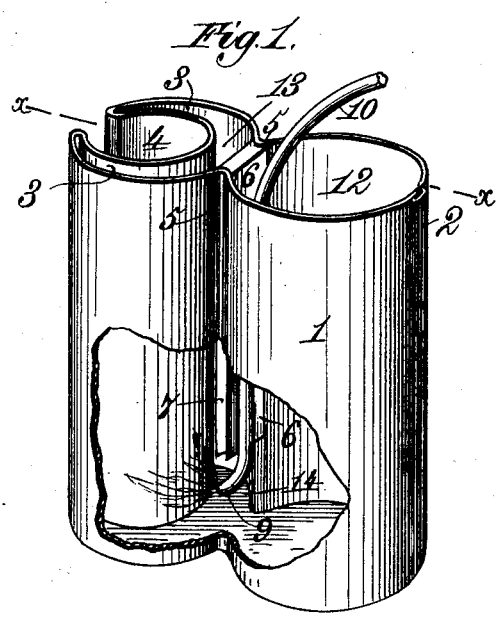
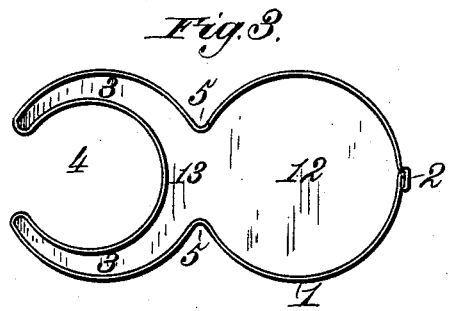
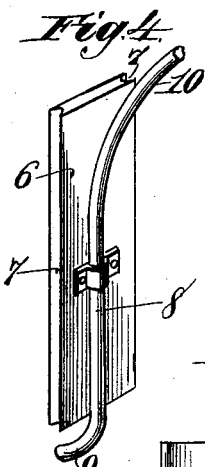
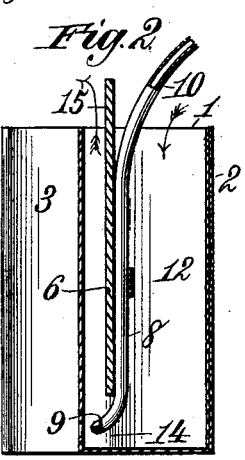
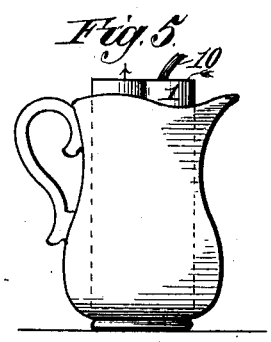
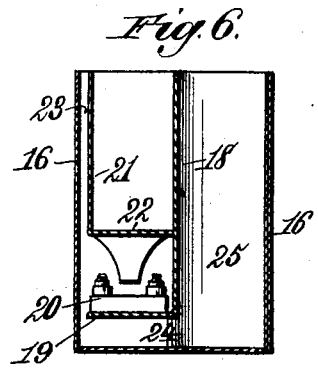
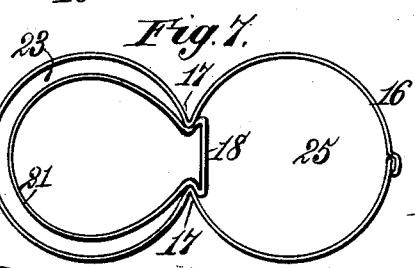
Witnesses.
Robert Evadt
Geo. E. Sullivan
Inventor.
Clarence M. Kemp.
By J. Granville Meyers
Att'y.
THE NORRIS PETERS CO., PHOTO-LITHO., WASHINGTON, D. C.

UNITED STATES PATENT OFFICE.

CLARENCE M. KEMP, OF BALTIMORE, MARYLAND.

WATER-HEATER.

SPECIFICATION forming part of Letters Patent No. 608,291, dated August 2, 1898.

Application filed September 15, 1897. Serial No. 651,813. (No model.)

*To all whom it may concern:*

Be it known that I, CLARENCE M. KEMP, a citizen of the United States, residing at Baltimore city, in the State of Maryland, have invented a new and useful Improvement in Water-Heaters, of which the following is a specification.

This invention relates to improvements in water-heaters, and more particularly to that type known as "submerged" water-heaters, in which a metallic vessel is immersed into the water to be heated, and the heating agent—such as a gas-jet, lamp, or similar device—is located within the vessel in such manner that the heat therefrom will impinge against the sides and bottom of the vessel, whereby the walls of said vessel become intensely heated, which heat is quickly absorbed by the surrounding water. Thus a quick and very effective device for heating water is obtained.

It is one purpose of this invention to provide a novel and simple form of vessel whereby the greatest possible heating-surface is had and wherein provision is made for an ample supply of air to the burner to support combustion.

It is another purpose of the invention to provide a vessel having a removable slide or partition which moves in suitable guides or supports in the vessel, said partition carrying the burner and being arranged to divide the vessel into two communicating compartments or channels, the partition, with its burner, being readily removed or elevated for the purpose of lighting the latter.

To these and other ends the invention comprises the novel features of construction and arrangements of parts hereinafter described and then more definitely pointed out in the claims which conclude this specification.

In order to enable others to understand, make, and use my said invention, I will proceed to describe the same in detail, reference being had for this purpose to the accompanying drawings, in which—

Figure 1 is a perspective view of a heater constructed in accordance with my invention, a portion of the side wall of the vessel being broken away to show the position of the burner. Fig. 2 is a vertical sectional view of the same on the line *x x*. Fig. 3 is a top plan view of the same with the partition removed. Fig. 4 is a detail perspective view of the partition, showing a gas-burner tube attached thereto. Fig. 5 is a side elevation of a pitcher, showing one of my heaters immersed therein in the act of heating water. Fig. 6 is a vertical sectional view of a modified construction of my invention wherein a lamp is employed. Fig. 7 is a top plan view of the same.

Referring now to the drawings, the reference-numeral 1 designates a tank or vessel the side walls of which are preferably formed from a single strip of sheet metal, the ends of which are joined and soldered at 2 on the end of the vessel, forming the fresh-air-supply channel, as will hereinafter be explained. The tank or vessel is provided with a closed bottom and an open top, and the end thereof opposite to the joint or seam 2 is preferably bent inward and shaped as shown in the drawings to provide a plurality of diverging hot-air channels 3 and an intermediate water-space 4, while the side walls of the vessel intermediate their ends are contracted or shaped to form vertical guides or supports 5. In the drawings I have shown the vessel as being provided with only two diverging hot-air channels and one intermediate water-space; but it will be obvious that a greater number of these channels and spaces may be formed without departing from the spirit of my invention.

The reference-numeral 6 designates a partition preferably provided with side grooves 7, which when the partition is in position within the vessel register with the guides 5 therein and serve to firmly support the same within the vessel and at the same time allow the partition to be moved vertically up and down at will for a purpose now to appear. Attached to and carried by the partition is a gas-burner tube 8, the jet end 9 of which is preferably bent slightly inward in order to direct its flame to the bottom and side walls of the vessel, and the upper end 10 of said tube projects out through the top of the vessel in a position to receive a flexible hose (not shown) through which the gas is supplied. When the partition is in position within the vessel, it divides the latter into two communicating compartments 12 13, the communicating passage 14 between said compartments being below the partition. In practice I prefer to provide the partition 6 with an extension 15, (shown in Fig. 3,) which projects beyond the top of the vessel in order to prevent the air drawn into the compartment 12 from being contaminated with the burned gases escaping from the compartment 13.

It has been found difficult to ignite the gas at the burner when the same is in place in the heater, as the gas often explodes and the flame is thereby extinguished. Therefore I have provided the arrangement above described wherein a sliding partition carrying the burner is employed, in which case the burner is lighted when the partition is drawn out, and then the same is pushed back into position within the vessel, the compartments 12 and 13 being so arranged that they act instantly as a chimney to draw out the burned gases and supply fresh air to the burner.

By the construction shown, in which the side walls of the vessel are formed from a single strip of sheet metal, a heater is provided that is very simple and inexpensive to manufacture, and since the only side joint is at the end of the vessel opposite to the direction of the flame the same will prove very durable.

In the modified form of my device illustrated in Figs. 6 and 7 the vessel 16 is made without the diverging channels; but it is provided with the contracted side walls, forming guideways 17, and in these guideways I arrange a vertically-sliding partition 18, having a shelf 19 at its lower end, upon which rests a lamp 20. Secured to the partition above the shelf is a tubular-shaped back 21, closed at the bottom 22 and somewhat smaller in diameter than the vessel, so that when in position within the latter an air-space 23 is formed around the same, through which the products of combustion pass, and the heat is thereby confined strongly against the walls of the vessel. The lamp used is preferably a center-draft lamp, and the latter is placed as low down in the vessel as practicable and a space or opening 24 being left below the shelf and partition, through which air can be supplied from the compartment 25 to the lamp.

While I have shown herein the use of but one burner, it will be understood that several burners can be employed in each heater to give a more intense heat, consideration being taken to make the relative capacities of the two channels or compartments harmonious. Likewise it will be understood that while it is preferable to make the vessel from sheet metal I do not wish to confine myself to this form specifically, for it may be made of cast metal.

Many water-holding vessels that from their very nature could not be placed over a flame—such as wooden buckets, glass jars, pitchers, and the like—can have their contents heated with this invention.

What I claim is—

1. As a new article of manufacture, a water-heater consisting of an open-top vessel having one end formed into a plurality of diverging hot-air channels with partially surrounding and intervening water-spaces, a vertically-sliding partition arranged transversely between the side walls of the vessel to provide an air-inlet channel opposite the said diverging channels, suitable guides or supports for the partition, an air-supply passage opening through the lower part of the partition to feed fresh air to the said diverging channels, and a suitable burner carried by the partition and arranged to discharge its heat into said latter-named channels.

2. As a new article of manufacture, a water-heater consisting of an open-top vessel having its side walls formed from a single piece of sheet metal, the edges of which are joined at the rear end of the vessel, said sheet metal being bent to provide a central contracted portion with two diverging channels on one side forming a central water-space, a vertically-sliding partition arranged transversely between the contracted walls of the vessel to form an air-inlet channel opposite the two diverging channels, said partition extending to near the bottom of the vessel but removed therefrom sufficiently to form a communicating passage between the channels, and a suitable burner carried by the said partition and arranged to discharge its heat into the two diverging channels.

3. As a new article of manufacture, a water-heater consisting of an open-top vessel the opposite side walls of which are contracted intermediate their ends to form guideways, a vertically-moving partition sliding between said guideways and extending to near the bottom thereof to divide the vessel into two communicating channels, the communicating passage being below the said partition, and a suitable burner carried by the partition and arranged to discharge the flame into one of the channels.

4. As a new article of manufacture, a water-heater comprising an open-top vessel having oppositely-disposed guideways upon the interior side walls thereof, a vertically-sliding partition moving between and supported by said guideways and extending near the bottom of the vessel to divide the same into two communicating channels or compartments, the communicating passage being below the partition, and a suitable burner secured to and carried by the partition and arranged to direct its heat to the bottom and lower part of one of said compartments.

5. As a new article of manufacture, a submerged water-heater consisting of an open-top vessel having its walls formed from a single piece of sheet metal, and the sides of said vessel being shaped to provide guideways, a vertically-movable partition supported by the guideways and arranged when in position to divide the vessel into two chambers or compartments allowing communication beneath the lower end of the partition, and a burner carried by the partition and arranged to impart heat to the bottom and lower part of one of the compartments, substantially as described.

CLARENCE M. KEMP.

Witnesses:
W. ROBY PURNELL,
JOHN S. COLE.